United States Patent Office 3,743,501
Patented July 3, 1973

3,743,501
ZINC RECOVERY PROCESS
Dominic C. Cusanelli, South Plainfield, Lamar D. Coffin, Edison, and Harold P. Rajcevic, Colonia, N.J., assignors to American Metal Climax, Inc., New York, N.Y.
Filed Aug. 17, 1971, Ser. No. 172,493
Int. Cl. C22b 3/00
U.S. Cl. 75—109                     11 Claims

ABSTRACT OF THE DISCLOSURE

An improved process for the hydrometallurgical recovery of zinc from oxidic lead-containing zinciferous material is provided wherein the improvement resides in selectively leaching the lead from said oxidic material by means of a relatively dilute solution of alkali metal hydroxide (e.g. NaOH) at an elevated temperature and at superatmospheric pressure sufficient to remove a substantial portion of the lead from the oxidic material and leave a residue enriched in zinc which may thereafter be recovered in any suitable manner.

---

This invention relates to the caustic leaching of zinc from oxidic materials and, in particular, to the caustic leaching of zinc from lead-containing zinc materials, such as roasted zinc sulfide concentrates, and lead-containing zinciferous oxide materials, such as smelter dust, drosses, slags, cupola oxide, converter oxide, arc furnace oxide, and the like materials.

THE PRIOR ART

The caustic leaching of zinc-bearing materials is well known in the art and goes back many years. One patent in particular, Ketchum Pat. No. 592,055, which issued in 1897, discloses a method for recovering zinc from mixed sulfide ores in which ore is concentrated in the well known manner and then dead roasted to remove substantially all of the sulfur. The roasted ore is then subjected to leaching by agitation in a vat containing a hot solution of caustic alkali of about 25% concentration. The solution is maintained below the boiling temperature, for example, 210° F. (99° C.). According to the patent, the solution dissolves both the lead and zinc in the roasted concentrate, with any iron in the oxide concentrate remaining as ferric oxide. The leach solution is thereafter subjected to electrolysis at a controlled voltage selective to the recovery of lead and zinc thereafter recovered at a higher voltage. It is preferred that the solution be hot and have a temperature of about 200° F. and higher.

A patent of particular interest is Pat. No. 1,825,949 to Charles C. Haas (1931) which is directed to a method of recovering zinc from ferrite-type zinc ores or from ores, such as frank-linite or from ores which, after being subjected to an oxidizing roast, tend to form insoluble compounds, such as zinc ferrite, which do not readily dissolve in the leach liquor.

According to Haas, such materials can be rendered soluble by subjecting the ferrite-containing material to a mild reducing roast to convert it to a more soluble compound capable of being leached. Thus, in the case of a ferrite-containing material, the reducing roast is carried out at a temperature above 400° C. (725° F.) and preferably above 550° C. (1022° F.) in the presence of a reducing agent such as carbon monoxide, hydrogen, or water gas, or mixtures thereof with inert gases. Although Haas recognized the use in the prior art of solid reducing agents such as coal or the like, the use of reducing gases was apparently considered preferable.

Winter No. 3,326,783 (1967) and Winter et al. No. 3,515,510 (1970) are more recently issued patents directed to the caustic leaching of zinc from oxidized zinc ore. In patent No. 3,326,783, the final product produced is electrolytic zinc powder. The process disclosed in the patent resides in controlling the temperature of the purifying and the electrolytic steps at above 122° F. (50° C.), and preferably between 150° F. to 192° F. (65° C. to 89° C.). Thus, after forming a sodium zincate solution by leaching the oxidized ore at approximately 200° F. (93° C.), the solution is purified of residual elements by treatment with zinc dust (cementation) at the aforementioned temperature range and the purified solution then electrolyzed over the same temperature range to deposit metallic zinc in the form of zinc dust, powder flake or sponge.

It should be noted that according to an article appearing in the Journal of the Electrochemical Society (100, 1953, pages 165–172) entitled "The Caustic Electrolytic-Zinc Process" by Baroch, Hilliard and Lang, leach zinc solution can be purified of residuals with zinc dust at temperatures of about 35° C. to 50° C. (95° F. to 122° F.).

In Pat. No. 3,515,510, the process is directed to the recoverey of zinc from iron-containing zinc sulfide concentrates which, upon roasting to remove the sulfur, react to form insoluble ferrites. Thus, to render the oxidized concentrate amenable to caustic leaching, the roasted concentrate is subjected to a reducing roast treatment in the presence of a reducing agent (e.g. carbon monoxide, hydrogen, coal and hydrocarbon oils or mixtures of two or more, including mixtures of a gaseous reducing agent with an inert gas) to decompose zinc ferrite formed during the desulfurizing roast. Following the reduction roast, the ore is then leached with a hot caustic soda solution containing by weight about 20 to 35% NaOH to solubilize the zinc values as sodium zinc values as sodium zincate. The solution is then purified with zinc dust to remove residual elements below zinc in the electrochemical series and the zinc thereafter recovered electrolytically.

While the foregoing processes appear to be generally useful in the recovery of zinc from zinc-bearing ores, particularly the processes described in Ketchum Pat. No. 592,055 and Haas Pat. No. 1,825,949, these methods had certain limitations when applied to zinc-bearing materials containing relatively high amounts of lead and, in some cases, a relatively high level of chlorine.

THE PROBLEM

Certain zinc-bearing materials contain relatively large amounts of lead which present a problem in zinc recovery. Such zinc-bearing materials are usually secondary by-product materials derived during metallurgical processing in a plant. Examples of such materials, which are generally oxidic, include smelter dust, lead and zinc bearing fumes recovered from furnace reactions (e.g. arc furnaces), cupola oxide, converter oxide, drosses, certain slags and the like. The problem also arises with regard to primary zinc-bearing materials, such as lead-containing zinc ores.

While lead can be removed from sodium zincate solutions by cementation with metals above it in the electrochemical series (e.g. Al, Zn, etc.), generally the cementation step is economical when only small amounts of lead and other elements are present.

It would be desirable to provide a process enabling the treatment of zinc-bearing oxidic materials containing relatively large amounts of lead and optionally chlorine in which lead is first selectively removed before recovering the zinc. As far as is known, no process is available for carrying out the foregoing objective.

OBJECTS OF THE INVENTION

It is thus the object of the invention to provide a caustic leaching process for recovering zinc from lead-containing zinciferous materials.

Another object is to provide a caustic leaching process for selectively separating lead from zinc contained in oxidic zinciferous materials, such as roasted zinc sulfide concentrates, cupola and converter zinc-bearing oxides, furnace oxide fumes, flue dust, drosses and certain slags, and the like.

A further object is to provide a process for recovering zinc from lead-containing zinciferouse materials wherein the lead is first selectively separated from the zinc, the zinc being thereafter subject to caustic leaching and then recovered electrolytically.

Still another object is to provide an apparatus for the electrolytic recovery of zinc from caustic leaching solutions.

These and other objects will more clearly appear when taken into conjunction with the following disclosure and the accompanying drawings, wherein.

SUMMARY OF THE INVENTION

Figure 1:
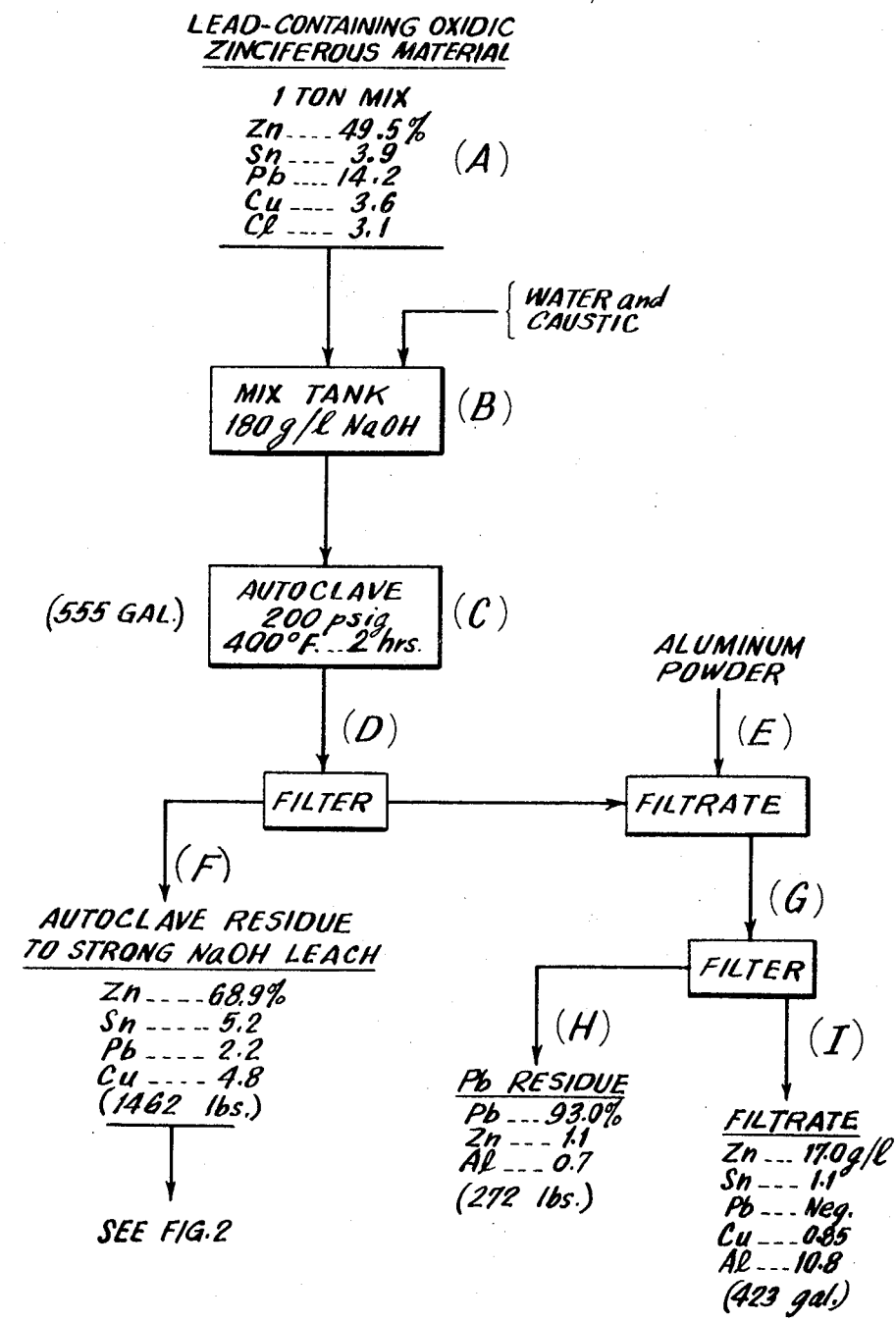
FIGS. 1 to 3 are flow sheets of various embodiments for carrying out the invention.

A hydrometallurgical process is provided for recovering zinc from oxidic lead-containing zinciferous material in which the lead is selectively leached from the material with a caustic solution under conditions which depress the solubility of zinc. This is achieved by carrying out the leaching at above atmospheric pressure using a relatively dilute solution of alkali metal hydroxide (e.g. NaOH) of concentration up to about 6 N at an elevated temperature conducive to dissolving the lead while depressing the solubility of zinc. The residue which is enriched in zinc can be thereafter leached with hot caustic soda solution at atmospheric pressure and at a temperature ranging up to about the boiling point of the solution, e.g. about 200° F. (93° C.).

The foregoing method is preferably employed on oxidic zinciferous materials containing at least about 5% by weight of lead and generally anywhere from about 10% to about 30% by weight of lead. The oxidic material may be dead roasted primary lead-containing zinc sulfide concentrate or any lead and zinc-containing material, including flue dust, cupola oxide, converter oxide or fume oxide from slag-cleaning furnaces and the like material.

Examples of typical secondary oxidic materials which have been treated in accordance with the invention are as follows:

TABLE 1

| Element | Composition, percent | | |
|---|---|---|---|
| | Cupola oxide | Converter oxide | Electric slag-cleaning furnace oxide |
| Zn | 46.4 | 40.4 | 64.8 |
| Pb | 11.4 | 20.4 | 13.6 |
| Sn | 1.0 | 13.4 | 0.4 |
| Cu | 5.2 | 3.8 | 0.2 |
| Cl | 5.7 | 0.6 | 0.4 |
| Ag | 22 opt[1] | 12 opt[1] | 8 opt[1] |
| Others[2] | Balance | Balance | Balance |

[1] Ounces of silver/ton.
[2] Combined oxygen, insolubles, etc.

The electric furnace oxide is the product of fumes from the arc furnace treatment of zinc-containing cupola slags. The foregoing materials, because of their high lead, tin, copper and silver content, have generally been sold for their contained metal values. However, their value would be potentially greater if recovered as relatively pure metals (e.g. zinc, lead, tin, copper and silver).

Results of pilot plant test work on a 100 gallon scale have confirmed the technical feasibility of the combined caustic leaching and the electrowinning process for treating secondary oxide materials. The process developed eliminates chlorine from the oxides and recovers in substantially upgraded form the lead, silver, zinc, tin and the copper values contained in them.

DETAILS OF THE INVENTION

One specific embodiment comprises subjecting a selected charge of secondary oxide containing lead and optionally chlorine to a dilute caustic preleach in which the charge is leached with a relatively dilute solution of sodium hydroxide at high temperatures in an autoclave at pressure above atmospheric pressure. A typical solution concentration is one containing 180 grams of NaOH/liter (about 4.5 N) employed at about 200° C. (395° F.) at a pressure of about 200 p.s.i.g. (about 14 kg./sq. cm.).

At such high temperature and pressure conditions, it has been found that the relatively dilute sodium hydroxide solution extracts all of the chlorine and a major portion of the lead from the charge without dissolving substantial amounts of the contained zinc. Usually, in this step, less than about 10% of the zinc in the charge is leached out, while up to 90% or more of the lead and about 100% of the chlorine is removed. Work on smelter dust has shown empirically that better results are obtained at higher temperatures, e.g. 200° C., than at lower temperatures, such as 100° C.

Following the preleach, the chlorine and substantially lead-free residue is next releached at about 100° C. with a relatively concentrated solution of sodium hydroxide containing, for example, about 400 grams/liter of NaOH (about 10 N). This leach suitably carried out at atmospheric pressure solubilizes whatever little lead remains in the residue and extracts substantially all of the zinc present in the charge as zinc oxide, the dissolved zinc being in the form of sodium zincate.

The zinc-rich solution from the caustic or sodium hydroxide leach is purified first of ferrous iron by aeration which precipitates iron as ferric hydroxide, and then, by cementation using a suitable metal as, for example, zinc ducts, whereby such other metal ions as lead are removed. The zinc dust or powder is added to the relatively hot, pregnant solution in small increments and the resulting purification-residue filtered off and the metal values there-in subsequently recovered.

As illustrative of the various embodiments of the invention, the following examples are given:

EXAMPLE (1A)

A blend of the oxide materials of Table 1 was prepared comprising two parts cupola baghouse oxide, one part converter baghouse oxide and one part electric-arc-furnace oxide to provide 150 pounds of oxide of the following average composition:

Table 2

| Element: | Percent |
|---|---|
| Zn | 49.5 |
| Sn | 3.9 |
| Pb | 14.2 |
| Cu | 3.6 |
| Cl | 3.1 |
| Others* | Balance |

*Combined oxygen, insolubles, etc.

150 pounds of the blended lead-containing oxide was placed in a mixing tank containing 180 grams/liter of NaOH, the liquid-to-solid ratio being about 2 pounds of solution to 1 pound of oxide, the ratio by weight of oxide to contained NaOH ranging from about 2.5 to 3 to 1. The mixture was then fed to an autoclave and subjected to a pressure of 200 p.s.i.g. at a temperature of about 400° F. (204° C.) and strongly agitated for about 2 hours. Following the high pressure leach, the slurry was filtered to provide a lead-containing filtrate and an autoclave residue having the following analysis:

Table 3

| Element: | Percent |
|---|---|
| Zn | 68.9 |
| Sn | 5.2 |
| Pb | 2.2 |
| Cu | 4.8 |
| Others* | Balance |

*Combined oxygen, insolubles, etc.

The filtrate was treated with aluminum powder sufficient to cement out the lead and provide a lead residue containing by weight 93% lead, 1.1% zinc, 0.7% aluminum and the balance residual elements. The filtrate contained about 17 g./l. of zinc, 1.1 g./l. of tin, 0.85 g./l. of copper and 10 g./l. of aluminum.

A flow sheet showing the treatment of one ton of blended oxides is shown in FIG. 1, the analyses of the various products being the same as those stated hereinabove. One ton of oxide mix (A) is added to mix tank (B) together with water and caustic to provide 180 g./l. of NaOH, the weight ratio of oxide to NaOH on the dry basis ranging from about 2.5 to 3 to 1. Following mixing, the slurry (555 gallons) is fed into autoclave (C) where it is treated for 2 hours at a temperature of 400° F. (204° C.) under a pressure of 200 p.s.i. Following the dilute caustic leach, the mixture is filtered (D) to provide a lead-containing filtrate (E) which is treated with aluminum powder to produce a cementation product containing 93% lead and a dilute filtrate containing 17 g./l. of zinc which is recovered by recycling. An autoclave residue (F) enriched in zinc to about 68.9% (1462 pounds) is obtained from which the zinc can later be extracted by a strong NaOH leach at ordinary pressure (note FIG. 2 and Example 1B below).

EXAMPLE (1B)

The autoclave residue from Example (1A) is subjected to a strong leach with a sodium hydroxide solution containing about 400 grams NaOH per liter, the leach being carried out at 203° F. (95° C.) for about 3 hours at atmospheric pressure. The ratio of liquid to solid is about 11 pounds of NaOH solution to 1 pound solid. The 150 pound charge of oxide will produce, after the lead leach, about 110 pounds of zinc-containing residue which when mixed with the proper amount of sodium hydroxide solution provides a 100 gallon batch. Following the strong leach, the solution was filtered to provide a residue having the following composition:

Table 4

| Element: | Percent |
|---|---|
| Zn | 14.4 |
| Sn | 20.7 |
| Pb | 0.86 |
| Cu | 16.4 |
| Ag | [1] 91.9 opt. |
| Others [2] | Balance |

[1] Ounces of silver/ton.
[2] Combined oxygen and insolubles.

The filtrate enriched in zinc is purified of residuals by cementation with zinc dust suitably recycled from the final purified product. The cementing out of copper, lead, tin, etc. is carried out at atmospheric pressure at a temperature of about 100° F. (about 38° C.), the filtrate remaining containing about 80 to 90 g./l. of zinc. The cementation residue had the following composition:

Table 5

| Element: | Percent |
|---|---|
| Zn | 50.0 |
| Sn | 3.0 |
| Pb | 29.0 |
| Cu | 13.0 |
| Others* | Balance |

*Residuals.

The purified zinc solution is recovered as zinc powder by electrolysis. Approximately 100 gallons of solution containing 80 to 90 g./l. of zinc is obtained from the original 150 pounds of oxide. However, the solution may contain any concentration of zinc in the range of about 120 g./l. to 30 g./l. from which the zinc may be electrolytically stripped to a level of about 20 g./l. The electrolysis is carried out in a cell in which the solution (400 g./l. of NaOH) is maintained at about 75 to 118° F. (24° C. to 48° C.) and in which anodes of nickel and cathodes of magnesium are used (details of electrolysis to be described later). The current was applied at 100 amp/sq. ft. at a cell voltage drop of about 3.8, the zinc being removed to a level of about 20 to 30 g./l. with a consumption of 1.5 kwh. per pound of zinc.

Figure 2:
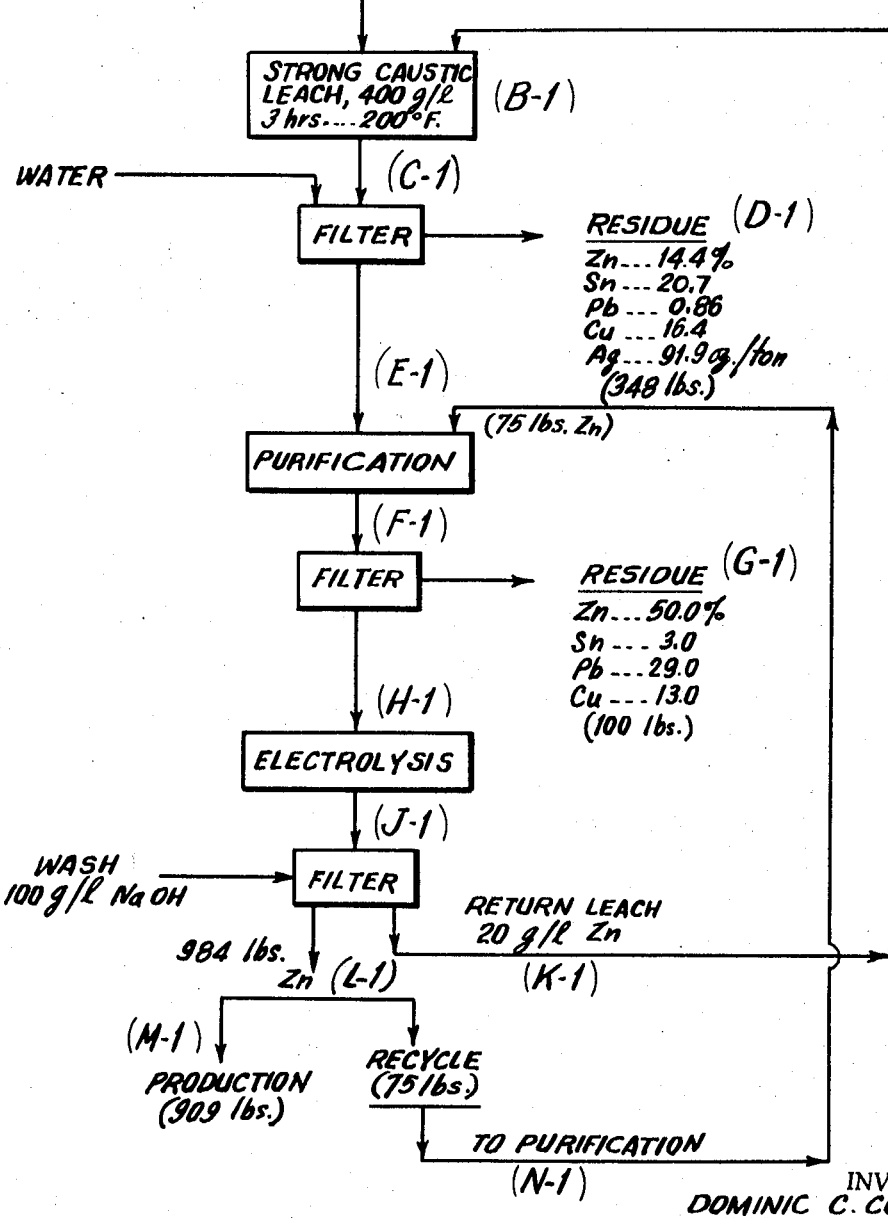

The flow sheet of FIG. 2 is a continuation of the flow sheet of FIG. 1 starting with one ton of oxide. As will be noted, the enriched zinc residue from the autoclave amounts to about 1462 pounds (A-1). The residue is mixed with a strong caustic solution (400 g./l. of NaOH) and leached at atmospheric pressure at a temperature of 200° F. for 3 hours (B-1). The leached residue is filtered at C-1 to provide 348 pounds of resdiue D-1 having the analysis stated hereinabove, the zinc-containing filtrate at E-1 being purified of residual metals below zinc in the electrochemical series by adding 75 pounds of zinc dust recycled from the end product to cement out such residuals as copper, lead and tin, the residue G-1 being filtered out at F-1, the purified pregnant solution being thereafter subjected to electrolysis at H-1 to form particulate zinc which is mechanically removed from the cathode, as by vibration and the like, to produce 909 pounds of zinc from the original 990 pounds contained in one ton of oxide, 75 pounds of zinc N-1 having been recycled to purification step E-1. The electrolyte containing 20 g./l. of zinc K-1 is recycled after caustic makeup to leach step B-1. Thus, starting with 990 pounds of contained zinc in one ton of oxide, a zinc recovery of about 91.7 is obtained not counting recovery of zinc in residues or end solutions. As will be apparent, zinc loss can be minimized by recycle of filtrate solutions and residues within the system.

Generally, zinc-containing by-product smelter oxides contain chlorine which should be removed prior to the strong alkali leach. Thus, the autoclave leach with relatively dilute alkali or caustic has the two-fold purpose of removing both the high lead present and chlorine. Elimination of chlorine is essential for two reasons: first, because chlorine consumes alkali or caustic in the strong caustic leach, thereby requiring additional make-up caustic to assure leaching efficiency; and, second, because chloride build-up in the electrolyte would have detrimental effects on electrolysis in that the presence of soluble chlorides promotes strongly adhering solid deposits of zinc on the cathode which are difficult to remove. To assure a continuous process, it is essential that a loose, pulverulent, deposit be contained so that it can be easily removed from the cell mechanically.

In one embodiment, the autoclave leach was carried out in an 80 gallon stainless steel vessel (Type 347) fitted with an electric, externally mounted, thermostatically controlled heating mantle. Strong agitation of the leaching solution was effected by means of a long-bladed heavy-slurry agitator mounted on a vertically disposed central shaft which entered the autoclave from the top, the agitator being driven at 145 r.p.m. using a 7.5 H.P. motor.

In one test, the charge to the autoclave containing 180 g./l. of NaOH solution was determined at a solution to oxide ratio of about 2 lbs. to 1. Upon completion of the autoclave leaching, the autoclave is cooled until the pressure falls to about 15 p.s.i.g. before filtering off the residue. The zinc-enriched residue cake obtained is washed with cold water and then transferred to the strong leaching step for the removal of zinc.

As shown in FIG. 1, the lead is removed from the autoclave leach filtrate by the addition of particulate aluminum. It takes approximately one pound of aluminum to precipitate 6.5 pounds of lead. In all runs, the lead cementation was carried out at a solution temperature of about 160° F. (70° C.) in an open tank.

In producing the zinc-containing electrolyte, a zinc concentration of about 80 to 90 g./l. has been found most advantageous for electrolysis. Thus, the relative amounts of residue from the autoclave leach and the 400 g./l. of NaOH solution are carefully proportioned to yield the desired electrolyte.

In purifying the zinc-containing solution obtained from the strong caustic leach prior to electrolysis, zinc powder is preferably used. The end point of the purification is determined by the $Na_2S$ test. This test is carried out by employing a white test plate to which is added a drop of solution being purified. To this drop is then added a drop of the test solution made by dissolving about 10 g. of $Na_2S$ in 100 ml. of water. A colored precipitate indicates the presence of impurities. A white precipitate indicates the end point.

It is important that the purification slurry be filtered immediately after reaching the purification end point because some of the metallic impurities tend to redissolve after a short period of time. Tin is difficult to remove from the pregnant liquor and should be as low as possible prior to the purification step.

A typical analysis of purified electrolyte is as follows:

Table 6

| Element: | Amount, g./l. |
| --- | --- |
| Zn | 70–90 |
| Pb | 0.0002 |
| Cu | 0.0001 |
| Cl | 0.020 |
| Fe | 0.0003 |
| Sb | 0.005 |
| As | 0.020 |
| Sn | Present |

The zinc produced by electrolysis is a flake type particle which deposits on the cathode as a loosely adherene sponge-like mass which falls apart when filtered. A typical screen analysis of the resulting zinc product is given below:

Table 7

| Mesh size: | Percent by wt. |
| --- | --- |
| +45 | 6 |
| −45+60 | 15 |
| −60+80 | 15 |
| −80+100 | 7 |
| −100+140 | 12 |
| −140+200 | 13 |
| −200 | 32 |

In addition to the recovery of zinc from secondary oxides, the invention is also applicable to the recovery of zinc from primary zinc-containing materials, such as roasted zinc sulfide concentrates. The recovery of copper, lead and zinc from certain sulfide minerals by pyrometallurgical techniques may be complicated by the particular nature of the mineralization in the ore. A particular high iron variety is one containing sphalerite (ZnS) chalcopyrite ($CuFeS_2$) and galena (PbS) characterized by a high degree of embedment of one mineral within another. A typical zinc sulfide concentrate obtained from this type of ore is as follows:

Table 8

| Element: | Percent by wt. |
| --- | --- |
| Zn | 47.0–49.0 |
| Pb | 0.5–1.5 |
| Cu | 0.4–0.5 |
| Fe | 12.0–14.0 |
| Total S | 31.0–35.0 |
| Sulfate S | 1.0 |
| Others* | Balance |

* Gangue material.

The foregoing ore is dead roasted to remove sulfur to below 2% and then leached to recover the zinc. Since the amount of lead in the ore is substantially below 5%, the roasted concentrate is not subjected to an autoclave leach. By-product oxides produced in the system generally contain high amounts of lead, which oxides are subjected to autoclave leaching for removing the lead as part of the secondary recovery of additional zinc from such by-product oxides.

However, the foregoing ore presents certain difficulties due to the presence of iron. During roasting, an insoluble compound is obtained, such as a ferrite (zinc ferrite) which interferes with the leaching efficiency in strong caustic solutions.

Pilot plant tests have shown that the zinc is recoverable from the foregoing ore, provided the dead roasted ore is subjected to a reducing roast to break up the ferrite. As illustrative of one method for recovering the zinc at fairly high efficiencies, the following example is given:

EXAMPLE 2

The zinc sulfide concentrate had the following composition:

Table 9

| Element: | Percent by wt. |
| --- | --- |
| Zn | 49.00 |
| Pb | 1.26 |
| Cu | 0.44 |
| Fe | 12.00 |
| S | 34.70 |
| Ag, opt* | 2.26 |
| Au, opt* | 0.014 |

*Ounces per ton.

Balance of concentrate is gangue.

A batch of the concentrate was subjected to fluidized roasting at a temperature of about 1400° F. (760° C.) the amount of air employed being about 130% of theoretical. The concentrate was dead roasted to a sulfur level below 2%, that is, to 1.44%, 90% of it being in the form of sulfate. The iron was in the ferric state and combined with zinc in the form of insoluble zinc ferrite.

After the completion of roasting, the calcined concentrate was mixed with about 5% by weight of carbon and reduced in a rotating kiln in an atmosphere containing CO at a temperature of about 1400° F. (760° C.). The ferrite was substantially completed decomposed and the roasted ore rendered amenable to leaching. The analysis of the reduction treated calcine was as follows:

Table 10

| Element: | Percent by wt. |
|---|---|
| Zn | 56.8 |
| Fe | 14.8 |
| Pb | 1.82 |
| Cu | 0.43 |
| S | 0.72 |
| Sn | 0.068 |
| Others* | Balance |

*Gangue, Ag, Au, etc.

The foregoing reduction-roasted concentrate was subjected as in Example 1B to a strong caustic leach with sodium hydroxide solution containing about 400 grams NaOH per liter (10N), the leach being carried out at about 200° F. (92.5° C.) for about 3 hours. The ratio of liquid to solid was about 11 pounds of NaOH solution to 1 pound of solid. The mixture constituted about 100 gallons. The leach residue had the following analysis:

Table 11

| Element: | Percent by wt. |
|---|---|
| Zn | 13.2 |
| Fe | 40.8 |
| Pb | 4.8 |
| Cu | 1.3 |
| S | 2.0 |
| Sn | 0.16 |
| Others* | Balance |

*Gangue, Ag, Au, etc.

The zinc-containing filtrate remaining was subjected to purification by the addition of zinc dust at a temperature of 100° F. (42.5° C.) for a time sufficient to remove residual elements as determined by the $Na_2S$ test. The resulting solution had a zinc content in the range of about 80 to 90 g./l.

The purified solution was then subjected to electrolysis at a bath temperature of about 75 to 118° F. (25° C.–48° C.) at a current density of about 100 amp/ft.$^2$ and a cell voltage drop of about 4.0 until the zinc content of the bath had reached a level of about 20 to 30 g./l.

Figure 3:
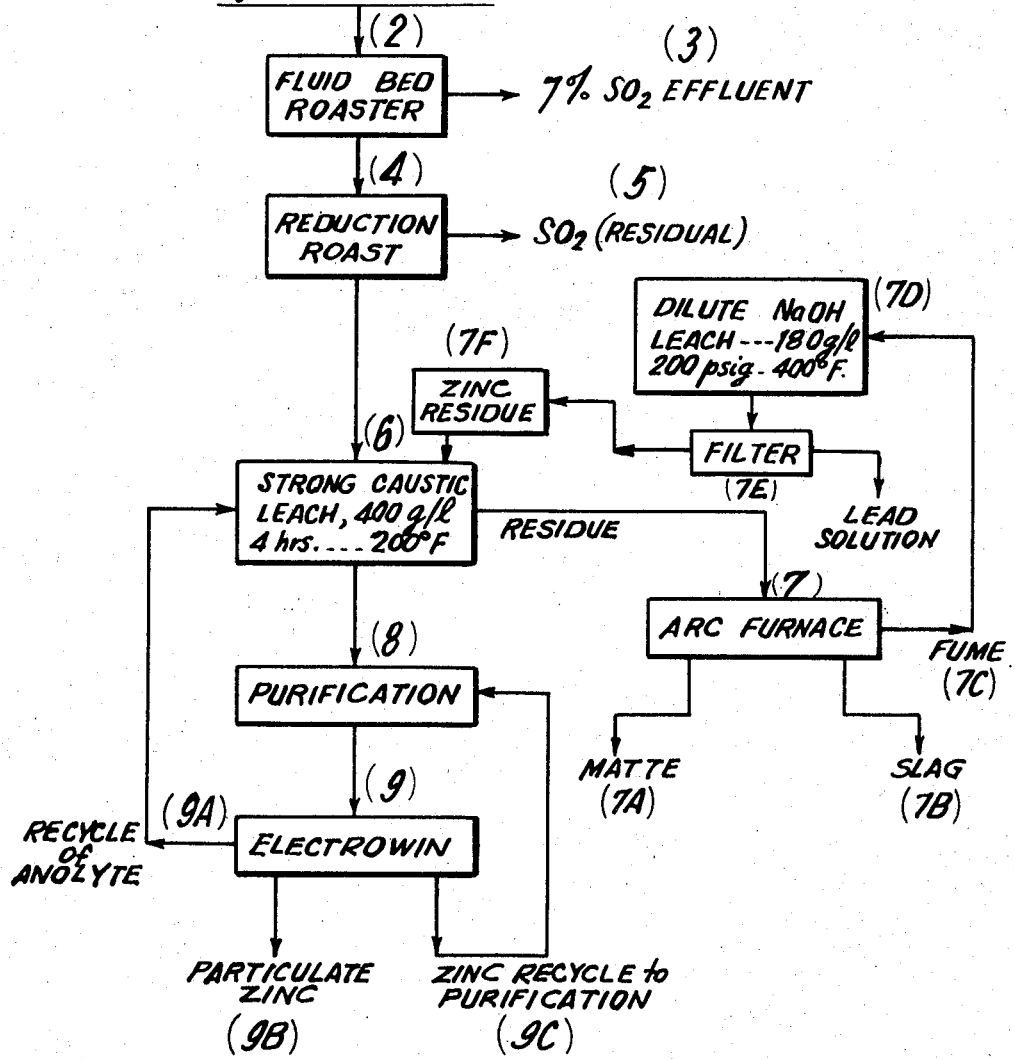

A flow sheet for treating zinc sulfide concentrate is depicted in FIG. 3 in which a batch of concentrate 1 is treated in fluid bed roaster 2, an effluent 3 being formed comprising about 7% $SO_2$. Following the fluidized roast, the oxidized zinc concentrate is subjected to a reduction roast to break up the ferrite and further reduce the sulfur. The reduction-roasted concentrate is subjected to strong caustic leaching 6, the residue remaining being fed to arc furnace 7 which produces a matte 7A and a slag 7B, a lead and zinc fume 7C being recovered as a fume oxide which may be treated in an autoclave 7D to separate the lead by selective solubilization thereof in accordance with the invention, the zinc residue 7F being then recycled to a strong caustic leaching step 6 where it is solubilized along with the primary roasted zinc oxide concentrate to form a zincate solution which is purified of residual elements with zinc dust 9C, the purified solution being thereafter electrolyzed at 9 to produce a pure zinc product 9B, a portion of the zinc 9C being recycled to purification. The anolyte, impoverished of zinc, is recycled to the strong caustic leaching step 6 for reuse in the leaching step, make-up caustic being added when required.

In a series of tests, the zinc recovery ranged from 84.3% to 89.5% of the total input zinc. Recycle of the zinc fume from the electric furnace through the dilute caustic leach 7D will raise the ultimate zinc recovery in a closed circuit system to approximately 95%.

Current efficiency of zinc electrolysis was in the neighborhood of 95.8%, with power consumption at about 1.63 kwh. per lb. of zinc.

As stated hereinbefore, a zinc product of fairly high purity is obtainable. Prior to purification, a typical leach filtrate had the following composition:

Table 12

| Element: | Grams/liter |
|---|---|
| Zn | 83.2 |
| Fe | 0.0022 |
| Pb | 0.0008 |
| Cu | <0.0001 |
| S | 0.136 |
| Sn | 0.0098 |

After purification with zinc dust, the leach filtrate had the following composition:

Table 13

| Element: | Grams/liter |
|---|---|
| Zn | 84.3 |
| Fe | 0.00048 |
| Pb | 0.00039 |
| Cu | <0.0001 |
| S | 0.143 |
| Sn | 0.008 |

Figure 4:
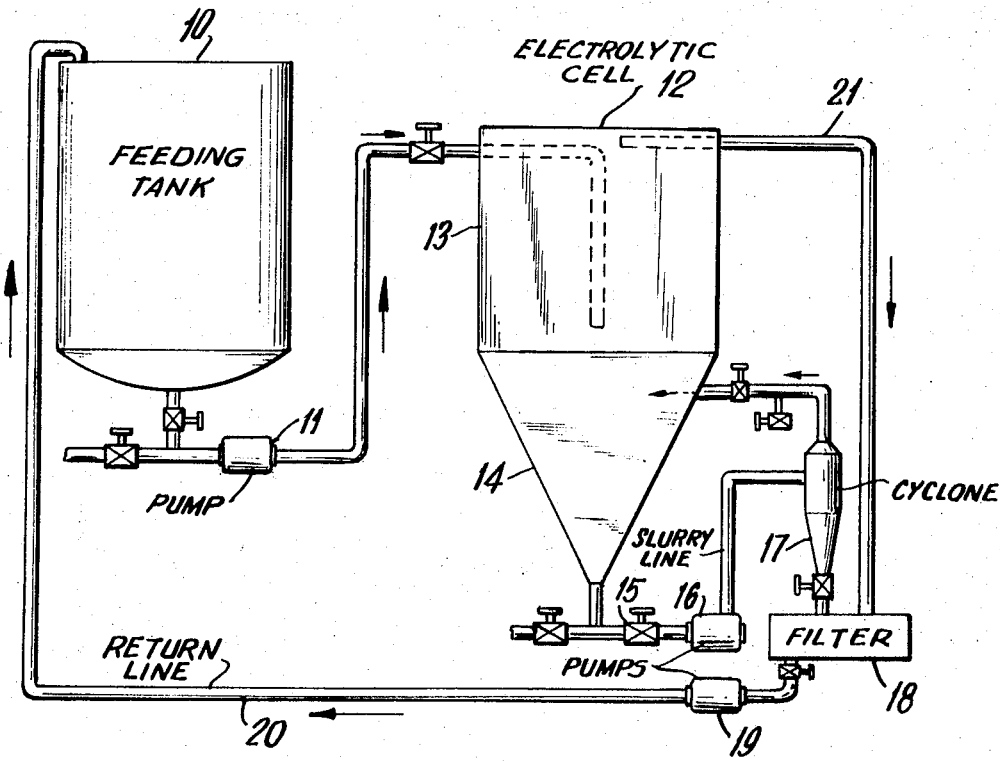
FIG. 4 shows schematically one embodiment of an apparatus for recovering zinc electrolytically from caustic leaching solutions.

The electrolysis of the zinc leach solution is preferably carried out on a continuous basis by employing an apparatus of the type shown schematically in FIG. 4. The electrolyte is maintained in a feed tank reservoir or vessel 10 from where it is removed by pump 11 and fed to cell or tank 12 which has a hopper-shaped bottom 14 into which the particulate zinc is collected by shaking or vibrating the cathode. The anode and cathodes are suspended at the upper portion 13 of the cell, such as shown in the plan view of FIG. 5.

The zinc which is collected at the bottom of hopper 14 is removed by means of valve 15 via pump 16 which directs the particulate zinc and solution into a high velocity circulation loop that includes a wet cyclone 17 which concentrates and discharges the zinc into a filter 18, the solution being withdrawn by pump 19 and pumped back to vessel 10 via line 20. It is preferred that the zinc particles be caused to fall to the bottom of the cell by deliberate periodic shaking or vibrating of the cathodes, particularly with the simultaneous operation of the high velocity circulation loop. The zinc is collected on the filter and then removed for washing and drying for subsequent melting and casting into commercial zinc slabs.

An overflow line 21 is provided connected to the top of cell 12 for discharging into filter 18 for delivery to vessel 10 in order to avoid spilling over of excess electrolyte, and to remove any floating zinc which may rise to the surface of the cell electrolyte.

Figure 5:
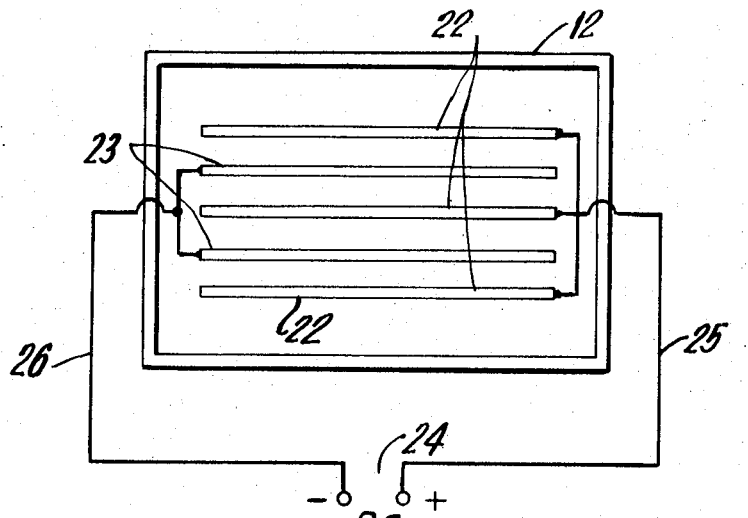
FIG. 5 is a schematic plan view of a typical plating tank (FIG. 4) for use in the electrolytic recovery of zinc from a caustic leaching solution.

Referring to FIG. 5, which is an enlarged plan view of cell 12 of FIG. 4, an anode-cathode arrangement is shown comprising anodes 22 measuring, for example, 20 inches by 25 inches and 0.25 inch thick, the anodes being made of cold-rolled unannealed nickel. Disposed between the anodes are magnesium cathodes 23 of the same dimensions. The nickel anodes are coupled in parallel via lead 25 and the magnesium cathodes in parallel via lead 26, the two leads being capable of being coupled to a source of D.C. voltage at 24.

In place of nickel, the anodes may be constructed of Type 304 stainless steel (18% Cr-8%Ni).

The zinc which deposits out as flakes on the cathodes is easily dislodged by vibration or manually by means of a plastic paddle. A heat exchanger is preferably employed to keep the temperature of the electrolyte below 113° F. (45° C.) to inhibit the generation of caustic fumes in the cell. This also aids in preventing the caustic fumes from condensing out between the cross rods holding the electrodes and the current-carrying bus bars on which the cross rods rest thereby minimizing the occurrence of poor electrical contacts.

As stated hereinbefore, under established conditions of 100 amp. sq. ft. of cathode current density with a cell voltage of 4.2 volts, power consumption is equivalent to 1.6 kwh./lb. of zinc produced. This averages out to about 0.25 lb. of zinc per square foot of cathode surface per hour.

The terms "alkali leach" or "caustic leach" are meant to include leaching solutions containing NaOH, KOH, LiOH and the like alkali metal hydroxides. In referring to dilute caustic leaching as applied to the autoclave leaching of lead-containing zinciferous materials for selectively removing substantially the lead present, such dilute leaching solutions are meant to cover alkali metal hydroxide concentrations of up to about 6 N concentration at superatmospheric gage pressures ranging from about 10 p.s.i.g. to as high as 500 p.s.i.g. over temperatures ranging from about 110° C. to 250° C.

As regards strong leaching solutions for leaching the zinc at atmospheric pressure, such caustic soda solutions may range from about 8 N concentration up to as high as 12 N at temperatures of at least about 80° C. and ranging up to the boiling point for the particular concentration employed.

After the zinc has been collected at the bottom of the cell and discharged as described hereinabove, residual traces of electrolyte are removed by a displacement wash with a dilute NaOH solution, e.g. a 100 g./l. NaOH solution. Following the caustic wash, the particulate zinc is given a water wash and dried in a vacuum dryer at an elevated temperature, e.g. 200° F. (93° C.). The dried particulate zinc is then compacted prior to melting. One method is to compact the powder by strip rolling between a pair of rolls, the compacted strip being then delivered into a molten pool of zinc contained within a melting pot. Following melting, the zinc is then cast into commercial sized slabs.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is.

1. In the hydrometallurgical recovery of zinc from an oxidic lead-containing zinciferous material, wherein the zinc is leached from said material and thereafter recovered, the improvement of first selectively leaching the lead from said material which comprises, subjecting said oxidic material containing at least about 5% by weight of lead to leaching with a dilute solution of alkali metal hydroxide of up to about 6 N concentration at an elevated temperature and superatmospheric pressure of about 10 to 500 p.s.i.g. sufficient to remove selectively a substantial portion of said lead from said material and form a lead-containing solution, and leave a residue containing substantial amounts of said zinc, separating said solution from said zinc residue, and then leaching said residue with a hot solution of alkali metal hydroxide of at least about 8 N concentration, thereby forming a zinc solution.

2. The leaching process of claim 1, wherein the concentration of the alkali metal hydroxide zinc-leaching solution ranges from about 8 N to 12 N, and wherein the temperature of the hot solution ranges from about 80° C. to the boiling point of the solution.

3. The leaching process of claim 2, wherein the resulting zinc solution following leaching is purified of residual elements by cementation with a metal lying above said residual elements in the electrochemical series and wherein said zinc is recovered by electrolysis.

4. The process of claim 1, wherein the lead is selectively leached from said oxide material with an alkali metal hydroxide solution of about 3 N to 6 N concentration at a temperature ranging from about 110°C. to 250° C.

5. The process of claim 4, wherein said solution is sodium hydroxide.

6. A hydrometallurgical process for the recovery of zinc from iron and lead-containing zinc sulfide concentrate which comprises,
    roasting said concentrate to remove substantially the sulfur contained therein and to convert the concentrate to the oxide state,
    subjecting said roasted concentrate to a reduction roast in the presence of a reducing agent to decompose any zinc ferrite present in said roast,
    subjecting said reduced concentrate to a primary leach with a hot solution of an alkali metal hydroxide of concentration of at least about 8 N whereby to leach a substantial portion of the zinc in the reduced concentrate and form a residue containing a substantial portion of said lead and iron together with sulfur and other residuals, melting said resdiue in the presence of a flux to form a matte containing substantial amounts of said residuals, a slag and a zinc and lead-containing fume containing at least about 5% lead which is recovered in the form of an oxide product,
    selectively leaching said fume oxide product with a dilute alkali metal hydroxide solution of up to about 6 N concentration at an elevated temperature above atmospheric pressure ranging from about 10 to 500 p.s.i.g. sufficient to remove selectively a substantial portion of the lead contained therein and form a lead-containing solution, and provide a residue rich in zinc,
    separating the solution from said zinc residue, and then leaching said zinc residue with a hot solution of alkali metal hydroxide of at least about 8 N concentration, thereby forming a zinc solution.

7. The method of claim 6, wherein the lead is selectively leached from said fume oxide product with a solution concentration of about 3 N to 6 N at a temperature ranging from about 110° C. to 250° C.

8. The process of claim 6, wherein said solution is sodium hydroxide.

9. The process of claim 6, wherein the zinc residue from the lead leach is leached by combining it with the reduced concentrate in the primary leaching step to leach the zinc therefrom.

10. The process of claim 6, wherein the zinc leach solution is subjected to electrolysis to remove the zinc therefrom.

11. A process for the recovery of zinc and lead from zinc and lead-containing oxidic materials selected from the group consisting of roasted zinc sulfide concentrates and secondary zinciferous oxide materials which comprises,
    subjecting oxidic material containing at least about 5% by weight of lead to leaching with a dilute solution of sodium hydroxide of concentration ranging from about 3 N to 6 N at a temperature of about 110° C. to 250° C. at a pressure of about 10 p.s.i.g. to 500 p.s.i.g. for a time sufficient to remove selectively substantially the lead from said material and form a lead-containing solution and an enriched zinc-containing residue,
    separating the solution from said zinc residue, recovering lead from said solution by cementation with a metal above lead in the electrochemical series,
    subjecting said zinc residue to leaching with a hot sodium hydroxide solution of concentration of at least about 8 N at a temperature ranging from about 80° C. to the boiling point of said solution,
    filtering said solution to provide a zinc-containing filtrate,

13 subjecting said zinc-containing filtrate to cementation by the addition of zinc dust to remove residual elements below zinc in the electrochemical series,
and then recovering said zinc from said solution by electrolysis.

References Cited

UNITED STATES PATENTS

| | | | |
|---|---|---|---|
| 592,055 | 1897 | Ketchum | 204—116 |
| 2,655,472 | 10/1953 | Hilliard et al. | 75—120 X |
| 3,326,783 | 6/1967 | Winter. | |
| 3,515,510 | 6/1970 | Winter | 75—120 X |

FOREIGN PATENTS

| | | | |
|---|---|---|---|
| Ad. 9,987 (of 1889) | 5/1890 | Great Britain | 75—120 |

HERBERT T. CARTER, Primary Examiner

U.S. Cl. X.R.

75—101 R, 120; 204—116, 338; 423—98, 109, 110